April 13, 1971     M. B. VORDAHL     3,574,569

METAL ARTICLES

Original Filed March 16, 1967     2 Sheets-Sheet 1

INVENTOR.
MILTON B. VORDAHL

By *Claire L. Mullen Jr.*

Attorney

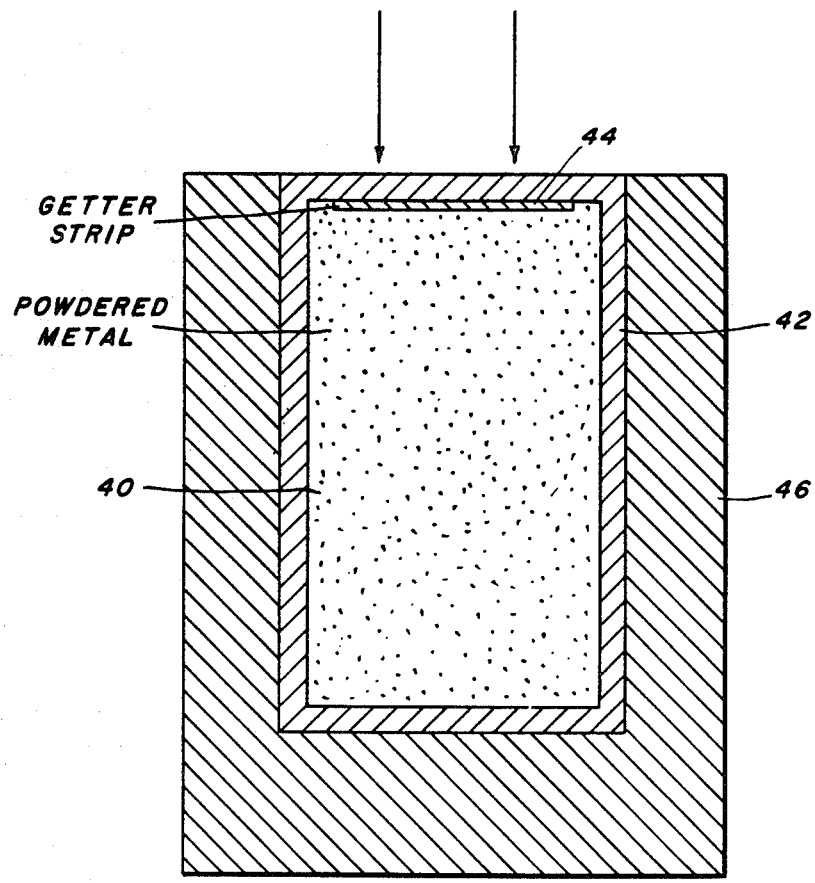

United States Patent Office 3,574,569
Patented Apr. 13, 1971

3,574,569
METAL ARTICLES
Milton B. Vordahl, Henderson, Nev., assignor to
Crucible Inc.
Application Mar. 16, 1967, Ser. No. 638,164, now Patent
No. 3,466,734, dated Sept. 16, 1969, which is a continuation-in-part of application Ser. No. 582,640, Sept. 28, 1966. Divided and this application Feb. 28, 1969, Ser. No. 823,222
Int. Cl. B23p 3/14, 3/22; C22c 15/00
U.S. Cl. 29—196
6 Claims

ABSTRACT OF THE DISCLOSURE

This application pertains to new and improved metal composite assemblies for pack rolling into composite articles and new and improved powdered-metal compacted articles and to methods for producing articles of these types, and, more particularly, to new and improved methods for producing and maintaining clean metal surfaces and improving bonding during manufacture of the articles.

For this purpose the present invention provides as a getter a beta alloy of titanium characterized by a beta micro-structure having substantial thermal stability throughout all heating and deforming operation performed upon the metal assembly with which the getter is used. The alloy is substantially free of other alloying elements that are productive of eutectic compositions with iron having melting points below the maximum temperatures used in the heating of the metal assembly. Specifically, a preferred getter in accordance with the invention is an alloy consisting essentially of about 13% by weight of vanadium, 11% by weight of chromium, 3% by weight of aluminum, and the balance substantially titanium.

---

This application is a divisional application of Ser. No. 638,164, filed Mar. 16, 1967, now United States Patent No. 3,466,734, which is in turn a continuation-in-part of my copending application, Ser. No. 582,640, filed Sept. 28, 1966, now abandoned.

The art relating to composite or laminated articles, as mill stock, comprising a plurality of laminae of different metallic materials, including those comprising alloys of iron, is presently extensive and varied and one which is of widespread current interest and under active research and development. For example, the production of such articles comprising laminae of carbon steel and "stainless" steel, e.g., chromium and/or chromium-nickel steels, is of great current interest, inasmuch as the products thereof are in increasing demand as economical replacements for solid stainless steel articles in such applications as, for example, automotive trim, bumpers, mufflers, architectural, constructional and decorative items, and many other applications requiring material having one or more surfaces resistant to oxidation, corrosion and mechanical abrasion.

Such laminated articles are generally produced by rolling relatively thick, juxtaposed laminates down to a final desired gauge while excluding air and other surface contaminants, the presence of which would effectively prevent bonding and decrease the delamination resistance of the rolled product. To assure good bonding between adjacent surfaces of the laminations, the same must be essentially free of oxides and other bond-preventing substances, and the usual method of assuring the required cleanliness is to include within the sealed pack to be rolled a substance, commonly called a "getter," having a high degree of affinity for the non-metallic, bond-inhibiting film-forming materials. Such getters commonly include the elements calcium, sodium, lithium, magnesium, barium, aluminum or the like which, at the rolling temperatures, are present in liquid or vapor form within the pack, thereby contacting and purifying all metallic surfaces. The use, however, of such prior art getters, which at the elevated temperatures required for heat treatment and/or rolling of the composite pack assembly are in liquid or vapor state, is disadvantageous in that such liquid or vaporous materials tend to produce undesirable eutectoid or other alloys with or coatings upon the metal being rolled. Moreover, many of these prior art materials, as, for example, sodium or calcium, existing in the vapor state at rolling temperatures, are toxic or otherwise quite dangerous upon the escape thereof from the pack if the same is ruptured during the rolling operation. Still more importantly, however, such prior art getters, in either liquid or solid form, penetrating throughout the pack and between the laminae of the composite, upon reaction with the undesirable impurities, form, as a result of such reactions, refractory compounds which themselves may be highly undesirable. For example, when calcium is used as a getter, the same reacts with oxygen within the atmosphere of the sealed pack to produce calcium oxide. The latter compound is quite refractory, and is actually used in many instances as a parting compound between laminae that are to be separated after rolling. It is therefore desirable to utilize, as a getter, a material that remains in the solid state during all heating and rolling operations upon the pack to avoid the disadvantages of materials in liquid or vapor form.

It might be considered that other materials, such as the metals titanium, zirconium, or base alloys thereof having relatively high melting points, and being highly reactive with impurities, such as oxygen, within the pack, could be utilized as getters. However, titanium and zirconium form with iron eutectic compositions which melt at relatively low temperatures. For example, the titanium-iron eutectic melts at about 1980° F. Hence, these elements and their base alloys are subject to many of the above-mentioned disadvantages of the prior art. Attempts to getter seal assemblies during the rolling with titanium have produced, within the steel pack, the aforesaid, low melting point eutectic composition, with consequent dangerous rupture of the pack wall.

Although a getter which remains in solid form throughout the heating and rolling of a pack is highly advantageous, as aforesaid in removing gaseous impurities within the pack, such a getter cannot, of course, if utilized in the conventional manner in the construction of a composite pack assembly, remove pre-existent films of bond-inhibiting materials which may be present upon the metal surfaces before heating or rolling of the pack or which may be formed upon such metal surfaces by reaction with gaseous impurities during heating and/or rolling and before such impurities are removed by the getter.

As with pack rolling assemblies, as described above, it is also advantageous to use a getter with assemblies that include powdered metal for heating and compacting into powdered metal compacts. To assure a final compacted article of good cleanliness and to promote bonding of the particles during compacting, it is advantageous that the powdered metal be essentially free of oxides and other bond-preventing substances. As with pack assemblies for rolling, the getter employed to removed impurities cannot be of the type that produces undesirable eutectoid or other alloys with or refractory compounds or coatings upon the powdered metal to be compacted. It may be seen, therefore, that the same getters that are advantageous in pack-rolling applications are for the same reasons advantageous for use in powder metallurgy applications wherein metal particles are heated to elevated temperature within a gas-tight container and then, while at elevated temperature, the container is collapsed to compact the powdered metal. Upon cooling of the compacted assembly, the container is removed to expose the metal compact contained therein.

Accordingly, it is an object of the present invention to provide a new and improved composite assembly for the pack rolling of laminae, at least some which laminae, or the pack wall, comprises iron or an alloy thereof, and which assembly incorporates, as a getter of gaseous impurities therein, a material, highly reactive with such impurities, which getter remains in the solid state throughout the heating and rolling of the pack.

It is another object of the invention to provide new and improved methods for rolling and bonding together laminate in a hermetically sealed composite pack assembly.

It is yet another object to provide an improved solid state getter which has a high capacity for removal of gaseous impurities within a pack assembly during heating and rolling thereof.

It is a further object of the invention to provide a method for enhancing the cleanlines of metal surfaces to be rolled in a pack, and thereby to enhance bonding therebetween, comprising utilizing within the pack a solid state getter and a gaseous reducing agent.

It is still a further object to provide means and method for simultaneously gettering the atmosphere within a sealed composite pack assembly and for effecting parting of laminae after rolling.

In accordance with the foregoing objects, the present invention provides, as a getter for removing gaseous impurities in a composite pack assembly to be rolled, and comprising, for example, steel laminae, a beta alloy of titanium characterized by a beta microstructure having substantial thermal stability throughout all heating and rolling operations performed upon the pack assembly, and which alloy is substantially free of other alloying elements which are productive of eutectic compositions with iron having melting points below the maximum temperatures used in the heating and rolling of the composite pack assembly. A preferred embodiment of the getters contemplated by the present invention for incorporation in such pack assemblies comprises an alloy consisting essentially of about 13% by weight vanadium, 11% chromium, 3% aluminum, balance substantially titanium.

Illustrative of a method of gettering contemplated by this invention, a preferred embodiment thereof comprises exposing the atmosphere within a composite pack assembly to be rolled, inclusive of iron alloy components, to a getter of the above-described composition. The inventive method preferably also comprises the step of introducing into the evacuated interior of a composite pack assembly a reducing gas such as dry hydrogen which, during the heating and rolling of the pack, continuously reduces bond-preventing films formed upon the metal surfaces, thereby freeing impurities, in gaseous form, which are thereupon removed the getter.

Illustrative of the novel composite pack assemblies contemplated by the invention, one embodiment thereof comprises a stock of laminae to be rolled and having interleaved between laminae to be parted after rolling a sheet or foil of a combined parting and gettering layer comprising a titanium base alloy as aforesaid.

The foregoing and other objects of the invention will be more readily apparent from an inspection of the following description and drawings wherein:

FIG. 5 is a cross-sectional view of a typical assembly wherein the alloy getter of the invention is used in the manufacture of powdered-metal compacts.

Figure 1:
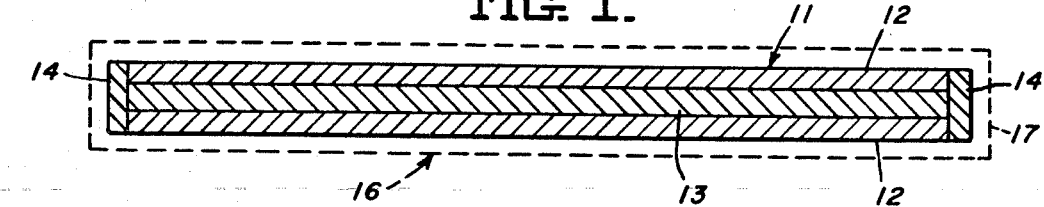
FIG. 1 is a cross-sectional view of one embodiment of a composite pack assembly wherein the contemplated solid state getter is provided in the form of a strip welded to the peripheral edges of the pack.

Referring now to the drawings, and more particularly to FIG. 1 thereof, the numeral 11 refers generally to an exemplary composite pack assembly comprising outer laminae 12 constructed, for example, of stainless steel, such as a common straight chromium steel, e.g., AISI 430 (14–18% chromium, balance substantially iron), or a chromium-nickel steel, e.g., AISI 302 (17–19% chromium, 8–10% nickel, balance substantially iron), and a carbon steel core 13, e.g., AISI 1010 (0.08–0.13% carbon, 0.30–0.60% manganese, 0.40 maximum phosphorus, 0.50 maximum sulfur, balance substantially iron). The pack 11 also comprises end or edge members 14 secured to the edges of the pack 11, as by welding and, if desired, extending about the periphery of the pack. The edge members 14 are constructed of an alloy of titanium having a beta microstructure which is substantially stable at the temperatures and for the length of time required for heating and rolling a composite pack assembly. Exemplary of such an alloy, which has been found to be eminently suitable in this respect, is an alloy containing 13% vanadium, 11% chromium, 3% aluminum, and the balance substantially titanium. Other titanium alloys are contemplated however, the restricting criteria being that such alloys have a beta structure, substantially stable with change in temperature, and free of formation with iron of low melting point (e.g., below about 2200° F.) eutectic compositions. A preferred alloying addition to titanium for this purpose is chromium and, if used alone, is preferably present in minimum amount of about 15% and may be utilized in relatively large amounts, for example, up to about 50%. Alloying elements, in addition to chromium or in substitution therefor, may be included. Thus, stable beta titanium alloys in accordance with my U.S. Patent No. 2,754,203 are, in general, suitable wherein the beta promoting elements are those which are beta isomorphous with titanium. The elements which I thus contemplate are molybdenum, vanadium, columbium, tantalum and chromium. In view of the fact, however, that a stable beta structure is required only prior to the period of heat treatment and rolling of the pack, which is typically a maximum of about 10 hours, the total amount of such alloying elements may be as low as about 15% and preferably contain a minimum amount of about 5% chromium. The eutectoid beta promoting elements are not preferred because of the tendency thereof to form relatively low melting point eutectic compositions with iron. Chromium is preferred over molybdenum due to the difficulties in alloying the latter element with titanium, and over vanadium, columbium and tantalum due to the high cost of the latter elements and, with respect to columbium and tantalum, for the additional reason of their higher melting points, as compared to that of titanium, and the consequent difficulty in producing homogeneous alloys thereof.

It is believed, although the present invention is not to be construed as limited by this hypothesis, that the abovementioned useful beta promoting alloying additions, nonreactive with iron to form low melting point eutectic compositions, form an effective barrier against continuing formation of the titanium-iron eutectic by progressive enrichment of the alloy, in respect to the beta promoter, at the interface at which eutectic formation begins.

Titanium-base alloys containing quantities of beta isomorphous alloying elements, as aforesaid, as a class exhibit the aforementioned desirable properties. Of course, the alloys utilizable as getters in accordance with the invention may incorporate other alloying elements which do not disadvantageously affect the alloys vis-a-vis any of the requisite properties as above described.

Reverting again to FIG. 1 of the drawings, the edge elements 14, of a composition as above described, may be affixed to the assembled metal laminae by suitable means such as welding thereby to hermetically seal the interior of the pack. Upon heating of the pack the edge strips act as a getter to effectively remove from the atmosphere within the pack all impurities such as oxygen, nitrogen, hydrocarbon vapors, sulfur, etc. In the heating and rolling of a pack assembly such as that illustrated in FIG. 1, i.e., a pack having an inner core of carbon steel clad with stainless steel laminae, it is ordinarily preferable to enclose the entirety of the pack within a further outer container or "can," for example, of carbon steel as indicated generally in dashed outline at 16 in FIG. 1. Even if such an outer can is not utilized, it is also ordinarily desirable to cover the outer surfaces of the peripheral getter strip with sealing strips 17, as indicated in FIG. 1. Such further strips 17 may be welded to the outermost top and bottom metal laminae to effectively preclude exposure of the outer surfaces of the getter strips to the atmosphere with consequent impregnation of the getter with atmosphere contaminants.

Figure 2:
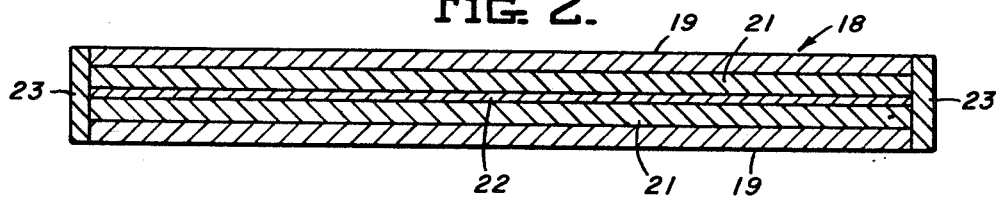
FIG. 2 is a cross-sectional view of another embodiment of a composite pack assembly wherein the contemplated solid state getter is provided in the form of a thin sheet or foil interposed between laminate to be parted after rolling.

Referring now to FIG. 2, the numeral 18 denotes generally a composite pack assembly comprising outer laminae 19, for example of stainless steel, and inner laminae 21, for example of carbon steel, to be joined by rolling. The inner laminae 21 are to be parted after rolling and hence require that a parting material be interposed therebetween. It has now been found that the solid state getter materials, as above described, serve as an excellent parting medium, even with heavy gauge reductions of the composite assembly, and at temperatures up to at least 2000° F. Accordingly, in another embodiment of the invention, illustrated in FIG. 2, the getter alloy, in the form of a thin sheet or foil layer 22 is interposed between the inner laminae 21, thereby serving as a combined getter and parting layer. Preferably, edge sealing strips 23 are welded to the periphery of the juxtaposed laminae to completely seal the interior of the pack.

Again, although the invention is not limited by hypothesis of method of performance, it is believed that the function of the getter alloy layer 22 as a parting layer is due to the formation of traces of an iron-titanium intermetallic compound which forms in sufficient amount to serve as an easy cleavage path for parting the laminae 21 after rolling.

The use of the contemplated getter alloy in the forms as exemplified hereinabove in the construction and rolling of composite pack assemblies, manifests a further necessary feature of the getter alloy, i.e., their ease of fabrication into a variety of physical forms, e.g. strip suitable for peripheral welding strip, or sheet or foil for use as a separating medium with laminae to be rolled. Furthermore, inasmuch as the getter, when included in the pack assembly in such forms, is subject to the same deformation forces as are applied to the pack laminae themselves, and to the same elevated temperatures during heating and rolling, it is also essential that such solid getter materials have the property of not being appreciably strengthened or hardened upon exposure to such elevated temperatures. As aforesaid, it is also essential that the contemplated getters not form with iron any eutectic or other low melting point alloy at temperatures below those at which the composite pack assembly is to be heat treated and/or rolled. These temperatures are nearly always below about 2400° F. and generally do not exceed about 2000–2200° F.

It has been found further that the functions of the contemplated alloy getter can be utilized to advantage by incorporating the same, in particulate form, in a parting layer between laminae to be parted after rolling. Desirably, the particulate getter is mixed with another parting material, for example, alkali metal oxides or alkaline earth metal oxides, in the form of a finely divided powder, to assure thorough and intimate contact with the surfaces to be separated.

Figure 3:
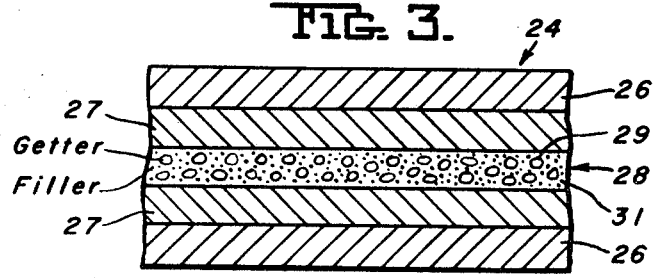
FIG. 3 is a fragmentary cross-sectional view of still another embodiment of a composite pack assembly wherein the solid state getter contemplated by the invention is provided in particulate form between adjacent laminae which are to be separated subsequent to rolling to final gauge.

FIG. 3 is illustrative of the latter embodiment of the invention, wherein the numeral 24 denotes generally a composite pack assembly comprising outer laminae 26, e.g. of carbon steel, and inner laminae 27, e.g. of stainless steel, wherein the inner and outer laminae are to be bonded together during rolling, and the inner laminae are to be separated from each other subsequnt to the rolling operation. Interposed between the inner laminae is a layer, denoted generally by the numeral 28, of a combined gettering and parting material comprising particles 29 of a getter alloy, as above described, and a carrier 31 of a suitable parting agent, as aforesaid. The getter alloy itself serves as a parting material when used in the embodiment of FIG. 3. Consequently, the proportions of getter alloy and other parting compound may vary widely, depending primarily upon the extent of gauge reduction of the pack and the efficiency of such other parting compound. Indeed, if desired, the layer 28 may consist substantially completely of the getter alloy. As in the above-described embodiments, sealing of the pack interior may be achieved by the use of welded edge members, or by enclosing the laminae inside a further envelope or container.

In a further embodiment of the invention, the beta-promoting elements, which may be molybdenum, vanadium, columbium, tantalum or preferably chromium, may be present as an alloying element in the alloy composition of the laminae. In this instance, the interposed getter material may be titanium per se, not alloyed with any beta-promoting elements. In this instance, the formation of the deleterious iron-titanium eutectic composition is inhibited—it is believed by the same mechanism as aforesaid—but the inhibiting agent, i.e., the beta-promoting element, is contained, as an alloying constituent, within the laminae to be rolled.

A highly desirable feature of using a getter as above described, is that the contemplated getter alloys do not form surface films that are resistant to further penetration of the contaminants to be removed from within the pack. Instead, since gaseous contaminants, primarily oxygen, but also other materials such as carbon, nitrogen, sulfur, etc., are highly soluble in the contemplated alloys, such impurities continuously are dissolved within the body of the getter material. Consequently, the capacity of such getter materials for removing such atmospheric contaminants from within the pack is quite high.

As above-mentioned, although the contemplated alloy getters of the invention are highly useful for removing gaseous impurities from the atmosphere within the sealed pack to be rolled, it is also desirable, as aforesaid, to provide for the continuous removal, during heating and rolling of the pack, of bond-inhibiting or bond-preventing films which may be formed, during heating and rolling, on the surfaces to be bonded. It has been found, by the present invention, that this additional function can be achieved by continuously evacuating the interior of the pack during the heating and rolling operations and continuously introducing into the interior of the pack a fluid reducing medium such as for example dry hydrogen. Hydrogen, in order to operate as an effective reducing agent under these circumstances, must have a very low dew point, e.g., about −60° F. or below. In such circumstances, the hydrogen pervading the interior of the pack readily reacts with any bond-inhibiting or -preventing films, such as oxides, which are formed in situ upon the surfaces to be bonded during heating and rolling of the pack. Upon reduction of such films by the hydrogen, the non-metallic components thereof are converted to gaseous form, such as oxygen, which is then readily sorbed by the getter. Furthermore, the contemplated alloy getters serve to clean the hydrogen supplied to the interior of the pack. For example, if the hydrogen carries some amount of water vapor—and it is very difficult to maintain the low dew points which are required for efficient reduction—the contemplated alloy getters reduce such water vapor to hydrogen and oxygen, the latter being, of course, immediately sorbed by the alloy getter.

Figure 4:
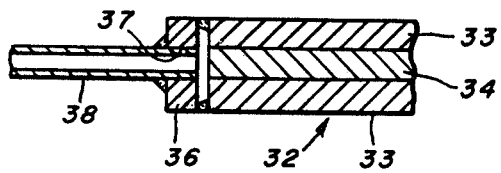
FIG. 4 is a fragmentary cross-sectional view of a composite pack assembly which is provided with means for the introduction into the interior of the pack of a gaseous reducing agent.

FIG. 4 is illustrative of a simple means for introducing the desired reducing gas into the interior of a pack to be heated and rolled. In FIG. 4, the numeral 32 designates generally a composite pack assembly, in fragmentary form, comprising outer laminae 33 and an inner core 34. The pack 32 is provided with an edge member 36 having an aperture 37 therein and to which there may extend a reducing-gas supply line 38 securely and hermetically sealed to the pack, as by welding. The edge member 36 is welded to the outer laminae 33. Obviously, the reducing hydrogen may be supplied to the pack interior in other manners.

FIG. 5 illustrates the use of the alloy getters of the invention, as above described, in conjunction with the manufacture of powdered metal compacts. Powdered metal, designated as 40, is placed in a flat-ended cylindrical container 42, which may be constructed of mild carbon steel. The powdered metal may, for example, be AISI M2S tool steel having a size consisting of substantially —100 mesh. Within the container 42 is provided a thin strip of a getter alloy of the invention, as described hereinabove; the alloy getter strip is designated as 44. The alloy getter strip 44 may consist of, for example, about 13% by weight vanadium, about 11% by weight chromium, about 3% by weight aluminum, and the balance substantially titanium. The strip 44 may have a thickness of about 10 mils. The container 42, having the powdered metal and getter strip therein, is heated to increase the temperature of the powdered metal to that required for compacting; this temperature is typically within the range of about 2000 to 2200° F. Upon heating to the selected elevated temperature required for compacting, the container 42 is placed within a die 46, which conforms substantially to the cross-section of container 42, and the container is collapsed and the metal particles or powder therein are compacted by application of axial pressure, in the direction of the arrows in FIG. 5, through the use of a ram (not shown). Upon the completion of this compacting step, the collapsed container 42 is taken from the die 46 and removed from the powdered metal compact by machining, pickling or a combination of both.

During the heating step, as described above, the getter removes impurities, such as oxygen and nitrogen, by the formation of titanium dioxide and titanium nitride. In this manner, the impurities are not present in the final compact. For this purpose, the amount of getter required will of course depend upon the volume of the container. With increased container volume, the amount of gaseous impurities requiring removal by the getter will increase correspondingly.

The term "metal assembly," as used herein, is intended to include composite metal assemblies for pack rolling and closed gas-tight containers containing a powdered-metal charge for compacting.

The foregoing specific embodiments of pack assemblies for rolling are merely illustrative of many pack constructions which may be utilized in connection with the inventive concepts herein. It is evident that other pack configurations and other laminae compositions may be utilized in connection with the practice of this invention. Furthermore, the specific embodiments of the getter compositions, the physical forms thereof utilized in association with the described composite pack assemblies, and the use thereof in the purification of the atmosphere within the packs and the consequent improvement of bonding efficiency between laminae, are merely illustrative of the broad principles of the invention, and modifications and additions to the specific disclosures may be made by those skilled in the art without departing from the spirit and scope of the invention.

What is claimed is:

1. In a metal assembly, at least a part of which comprises an alloy of iron, having a plurality of metal surfaces to be bonded, said metal surfaces being sealed against the atmosphere, a getter for removing impurities and enhancing bonding between said metal surfaces, said getter comprising an alloy having a beta microstructure characterized by substantial thermal stability against transformation and being substantially non-reactive with iron during heating of said assembly, said alloy comprising, by weight percent, at least about 15% of at least one element which is beta isomorphous with titanium, and the balance substantially titanium.

2. In an assembly in accordance with claim 1 wherein said getter alloy comprises at least one said element selected from the group consisting of molybdenum, vanadium, columbium, tantalum, and chromium, and the balance substantially titanium.

3. An assembly in accordance with claim 2 wherein said getter alloy comprises at least about 5% by weight of chromium.

4. An assembly in accordance with claim 2 wherein said getter alloy comprises at least about 10% by weight of chromium.

5. An assembly in accordance with claim 2 wherein said getter alloy comprises at least about 15% by weight of chromium, and the balance substantially titanium.

6. An assembly in accordance with claim 1 wherein the getter comprises an alloy consisting essentially of, by weight percent, about 13% vanadium, 11% chromium, 3% aluminum, and the balance substantially titanium.

References Cited

UNITED STATES PATENTS

| | | | |
|---|---|---|---|
| 3,125,805 | 3/1964 | Horigan | 29—196.6X |
| 3,147,115 | 9/1964 | Vordahl | 75—175.5 |
| 3,156,590 | 11/1964 | Vordahl | 75—175.5X |
| 3,266,951 | 8/1966 | Vordahl | 75—175.5X |

L. DEWAYNE RUTLEDGE, Primary Examiner

J. E. LEGRU, Assistant Examiner

U.S. Cl. X.R.

29—196.6; 75—175.5